United States Patent
Hong

(10) Patent No.: US 11,642,623 B2
(45) Date of Patent: May 9, 2023

(54) AMMONIA GAS REMOVAL SYSTEM USING CO2 ULTRAFINE BUBBLE

(71) Applicant: Sung Kwang ENF Co. Ltd., Daejeon (KR)

(72) Inventor: Won Seok Hong, Sejong-si (KR)

(73) Assignee: SUNG KWANG ENF CO. LTD., Daejeon (KR)

(*) Notice: Subject to any disclaimer, the term of this patent is extended or adjusted under 35 U.S.C. 154(b) by 334 days.

(21) Appl. No.: 16/910,061

(22) Filed: Jun. 24, 2020

(65) Prior Publication Data

US 2021/0170330 A1 Jun. 10, 2021

(30) Foreign Application Priority Data

Dec. 6, 2019 (KR) .................. 10-2019-0161812

(51) Int. Cl.
| | | |
|---|---|---|
| B01F 23/21 | (2022.01) | |
| B01F 23/23 | (2022.01) | |
| B01D 53/58 | (2006.01) | |
| B01D 53/78 | (2006.01) | |
| C02F 1/66 | (2023.01) | |

(Continued)

(52) U.S. Cl.
CPC ............ $B01D\ 53/58$ (2013.01); $B01D\ 53/78$ (2013.01); $B01D\ 53/79$ (2013.01); $B01F\ 23/213$ (2022.01); $B01F\ 23/214$ (2022.01); $B01F\ 23/231$ (2022.01); $B01F\ 23/2373$ (2022.01); $B01F\ 23/23121$ (2022.01); $B01F\ 25/3121$ (2022.01); $B01F\ 25/31242$ (2022.01); $B01F\ 25/431$ (2022.01); $C02F\ 1/52$ (2013.01); $C02F\ 1/66$ (2013.01); $B01D\ 2252/103$ (2013.01); $B01F\ 23/23762$ (2022.01); $B01F\ 2101/305$ (2022.01); $C02F\ 2001/5218$ (2013.01)

(58) Field of Classification Search
CPC ...... B01F 23/21; B01F 23/213; B01F 23/214; B01F 23/231; B01D 53/58
See application file for complete search history.

(56) References Cited

U.S. PATENT DOCUMENTS

| | | |
|---|---|---|
| 2013/0045934 A1 | 2/2013 | Tsuji et al. |
| 2013/0113125 A1 | 5/2013 | Song et al. |

(Continued)

FOREIGN PATENT DOCUMENTS

| | | |
|---|---|---|
| CN | 102883788 A | 1/2013 |
| CN | 102985172 A | 3/2013 |

(Continued)

OTHER PUBLICATIONS

Chinese Office Action for CN Application No. 202010635111.5 dated Jun. 7, 2022.

(Continued)

*Primary Examiner* — Robert A Hopkins

(74) *Attorney, Agent, or Firm* — Cantor Colburn LLP

(57) ABSTRACT

There is provided an ammonia gas removal system, including a fine bubble generation device which is configured to receive at least a portion of scrubber process water from a storage tank, and to generate fine bubbles containing carbon dioxide gas in the received scrubber process water, the storage tank being configured to store the scrubber process water to be provided to a gas scrubber, the gas scrubber being configured to spray the process water onto ammonia-containing gas.

6 Claims, 15 Drawing Sheets

(51) Int. Cl.
*C02F 1/52* (2023.01)
*B01D 53/79* (2006.01)
*B01F 23/231* (2022.01)
*B01F 25/431* (2022.01)
*B01F 25/312* (2022.01)
*B01F 23/2373* (2022.01)
*B01F 23/213* (2022.01)
*B01F 23/237* (2022.01)
*B01F 101/00* (2022.01)

(56) References Cited

U.S. PATENT DOCUMENTS

2013/0186272 A1 7/2013 Balfe et al.
2015/0258491 A1 9/2015 Chien
2018/0272276 A1 9/2018 Lu et al.

FOREIGN PATENT DOCUMENTS

| | | | | |
|---|---|---|---|---|
| CN | 208911806 | U | | 5/2019 |
| CN | 210584342 | U | * | 5/2020 |
| JP | 2008161782 | A | * | 7/2008 |
| KR | 200285156 | Y1 | | 8/2002 |
| KR | 20-0358372 | Y1 | | 8/2004 |
| KR | 100884286 | B1 | | 2/2009 |
| KR | 100938911 | B1 | | 1/2010 |
| KR | 10-2012-0089932 | A | | 8/2012 |
| KR | 10-1467150 | B1 | | 12/2014 |
| KR | 101550990 | B1 | | 9/2015 |
| KR | 2043819 | B1 | * | 11/2019 .......... B01D 47/021 |
| TW | M483123 | U | | 8/2014 |
| TW | 201834735 | A | | 10/2018 |

OTHER PUBLICATIONS

Taiwanese Office Action for TW Application No. 109122686 dated Nov. 18, 2021.

Korean Office Action for KR Application No. 10-2019-0161812 dated May 25, 2022, citing the above reference(s).

* cited by examiner

AMMONIA GAS REMOVAL SYSTEM USING CO2 ULTRAFINE BUBBLE

CROSS-REFERENCE TO RELATED APPLICATIONS

This application is based on and claims priority under 35 U.S.C. § 119 to Korean Patent Application No. 10-2019-0161812, filed on Dec. 6, 2019, in the Korean Intellectual Property Office, the disclosure of which is herein incorporated by reference in its entirety.

BACKGROUND

1. Field

The present disclosure relates to an ammonia gas removal system using $CO_2$ ultrafine bubbles.

2. Description of the Related Art

Gas generated in a semiconductor manufacturing process or gas discharged from a typical plant, a power plant, or a combustion furnace may contain ammonia gas. The ammonia gas is toxic and thus should be removed. A related-art method removes ammonia gas by injecting sulfuric acid ($H_2SO_4$) or hydrochloric acid (HCl) into ammonia-containing gas, or injecting sulfur dioxide ($SO_2$) or acid flue gas.

For example, Korean Patent Registration No. 10-0938911 (Jan. 19, 2010, titled "A gas scrubber for removing ammonia from exhausted gas") or Korean Patent Registration No. 10-0884286 (Feb. 11, 2009, titled "Wet scrubber system") (hereinafter, referred to as '286 prior patent) discloses technology for removing ammonia gas. '286 prior patent discloses technology for removing ammonia gas by injecting pure water, sulfuric acid ($H_2SO_4$) or hydrochloric acid (HCl), or injecting sulfur dioxide (SO2) or acid flue gas.

A massive amount of exhaust gas having concentrations ranging from hundreds of ppm to thousands of ppm may be generated, and processing such exhaust gas through high-temperature pyrolysis has the demerit of high-cost of driving. In a method of dissolving using clean water, ammonia gas dissolved by solubility/gasification equilibrium of gas may return to a gasified state and may be discharged in the gasified state, and thus there is the demerit of low processing efficiency.

SUMMARY

The present disclosure has been developed in order to solve the above-described problems, and an object of the present disclosure is to provide an ammonia gas removal system which can reduce an amount of used carbon dioxide and can save a reaction time, by performing neutral reaction by dissolving carbon dioxide in process water in a high concentration, and a CO2 ultrafine bubble generation device used therein.

According to one or more embodiments of the present disclosure, efficiency of a gas/liquid reaction between CO2 gas and process water can be enhanced. That is, carbon dioxide is dissolved in process water in a high concentration in a fine bubble generation method, and a sudden chemical reaction between carbon dioxide and water is induced, such that ammonium ions can be rapidly generated.

In addition, by making ammonia gas exist in the form of ammonium ions in the 100% liquid state, processing efficiency can be enhanced.

In particular, according to one or more embodiments of the present disclosure, ammonia gas included in a huge amount of exhaust gas can be rapidly and economically removed.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EMBODIMENTS

Figure 1:
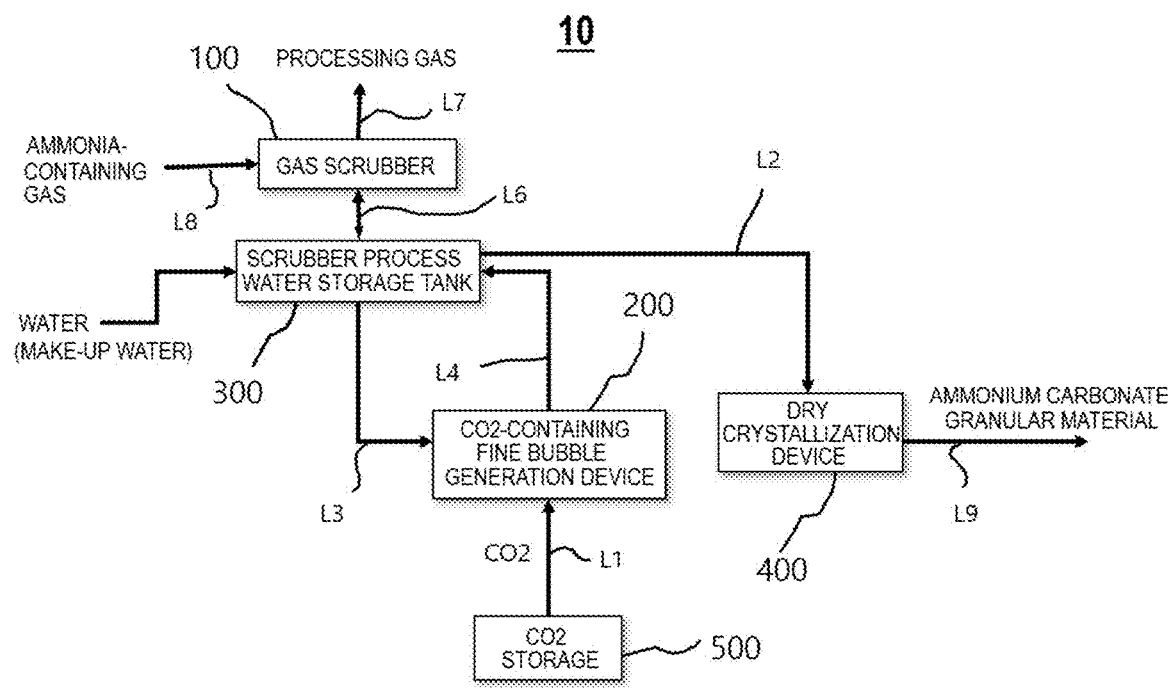
FIG. 1 is a view provided to explain an ammonia gas removal system according to a first embodiment of the present disclosure.

Exemplary embodiments will now be described more fully with reference to the accompanying drawings to clarify objects, other objects, features and advantages of the present disclosure. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that when an element is referred to as being "on" (or "under", "on the right of", or "on the left of") another element, the element can be directly on (or "under", "on the right of", or "on the left of") another element or intervening elements. In the drawings, lengths, widths, and thicknesses of elements are exaggerated for easy understanding of technical features.

The expressions such as "upper (top)," "lower (bottom)," "left," "right," "front surface," "rear surface," etc. used in the detailed description to explain a position relationship between elements do not mean directions or positions as an absolute criterion, and may be relative expressions used for convenience of explanation with reference to a corresponding drawing when the present disclosure is explained with reference to each drawing.

If the terms such as 'first' and 'second' are used to describe various elements, these elements should not be limited by such terms. These terms are used for the purpose of distinguishing one element from another element only. The exemplary embodiments explained and illustrated herein include their complementary embodiments.

As used herein, the singular forms are intended to include the plural forms as well, unless the context clearly indicates otherwise. It will be further understood that the terms "comprise" and/or "comprising," when used in this specification, do not preclude the presence or addition of one or more other components.

Principle of the Present Disclosure

According to various embodiments of the present disclosure, ammonia gas can be removed by using process water that CO2 (or "carbon dioxide" or "$CO_2$") in the form of ultrafine bubbles is injected into. Fine bubbles containing CO2 gas has the features of low buoyant force, slow liftoff speed, large specific surface area, high solubility, charging by anions, and diffusion, and the ammonia gas can be efficiently removed by such features.

Figure 12A:
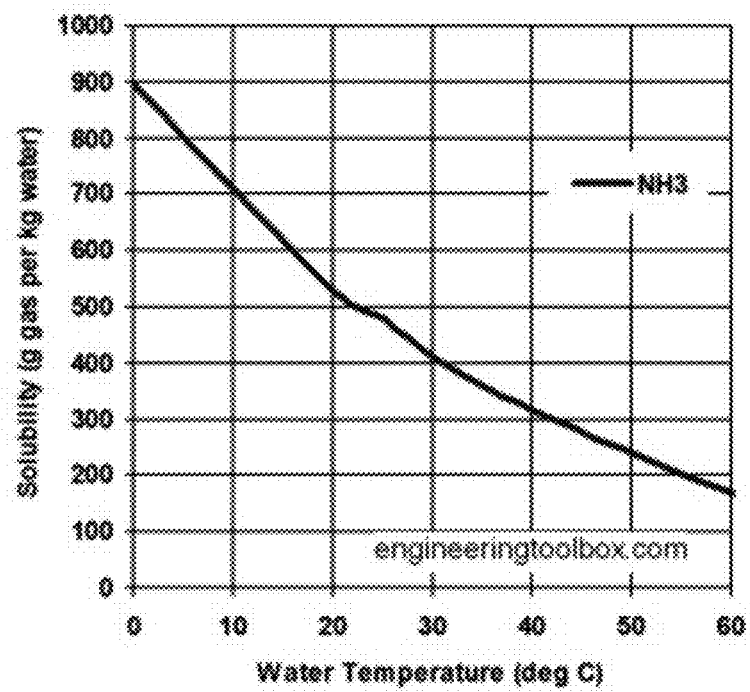
FIGS. 12A and 12B, FIGS. 13A to 13D, FIGS. 14A and 14B, and FIG. 15 are views provided to explain effects of the present disclosure.
Figure 12B:
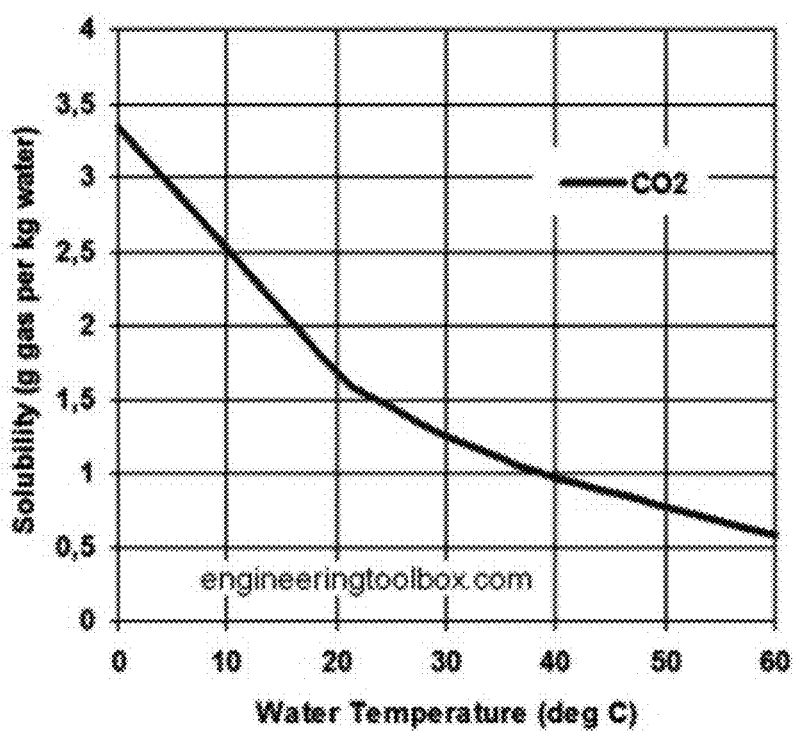
Figure 13A:
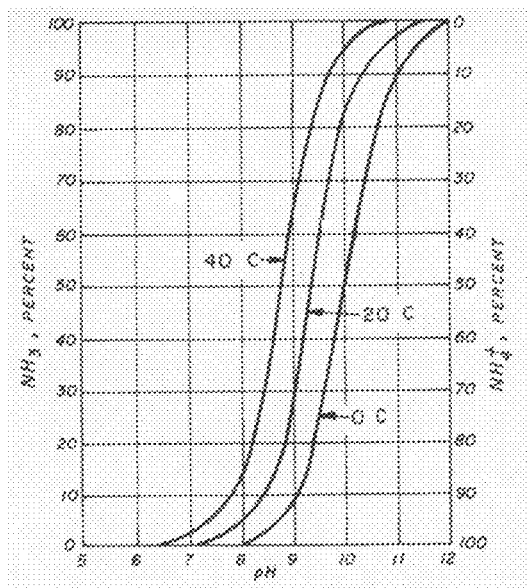
Figure 13C:
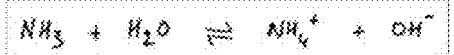
Figure 13B:
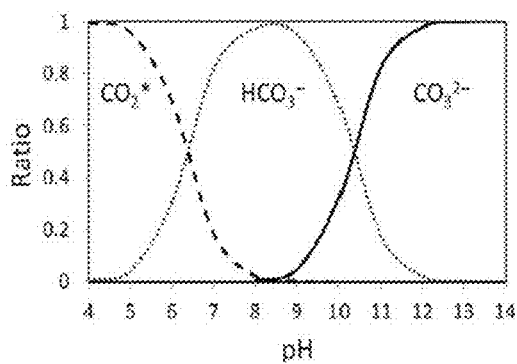
Figure 13D:
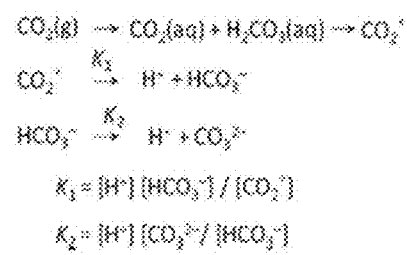

Ammonia gas and carbon dioxide have the feature that they are well dissolved in water (see FIGS. 12A and 12B). Ammonia gas dissolved in water may exist in the form of ammonia gas and ammonium ions, and may exist in the form of ammonium ions if it has acidity of low pH. In the present disclosure, it is preferable that ammonia gas dissolved in water exists in the form of ammonium ions, and this is because when ammonia gas exists in water, ammonia gas has high volatility (see FIGS. 13A to 13D).

According to various embodiments, ammonium ions dissolved in water dissolves in a liquid state in an appropriate condition and is crystallized into ammonium carbonate. In the present disclosure, it is important to maintain ammonium ions dissolved in water in the liquid state, and conditions for achieving this includes a pH condition and a liquid state maintaining condition. According to embodiments, both the pH condition and the liquid state maintaining condition are configured to be satisfied.

The pH condition is a condition for making process water to have low pH. For example, as shown in FIGS. 13A to 13D, if pH is less than or equal to 7 at about 20 degrees, ammonia gas liquefied in water may exist in the form of 100% ammonium.

Figure 14A:
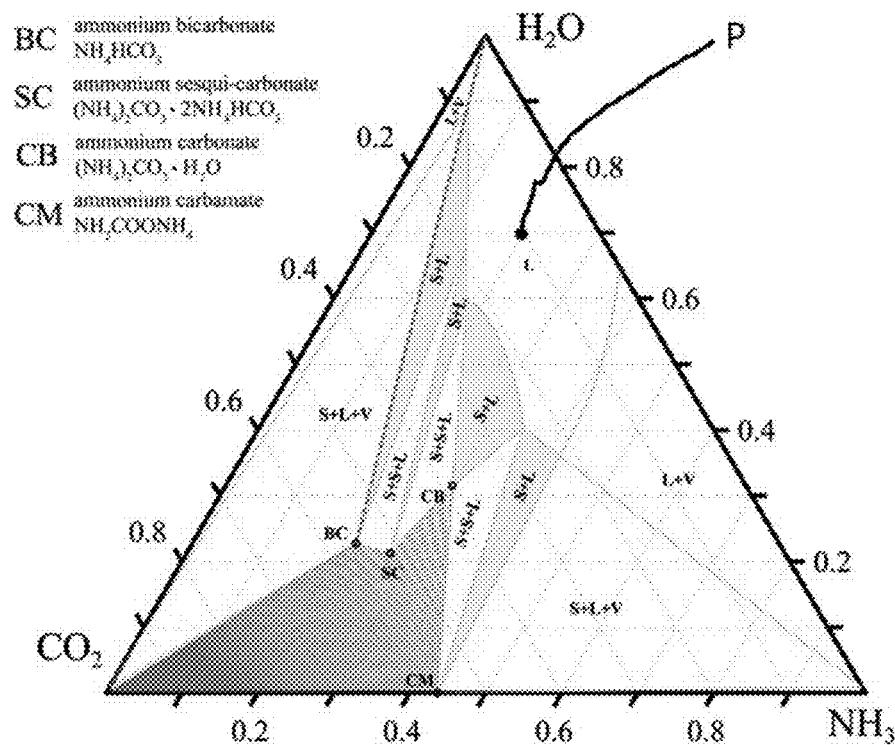
Figure 14B:
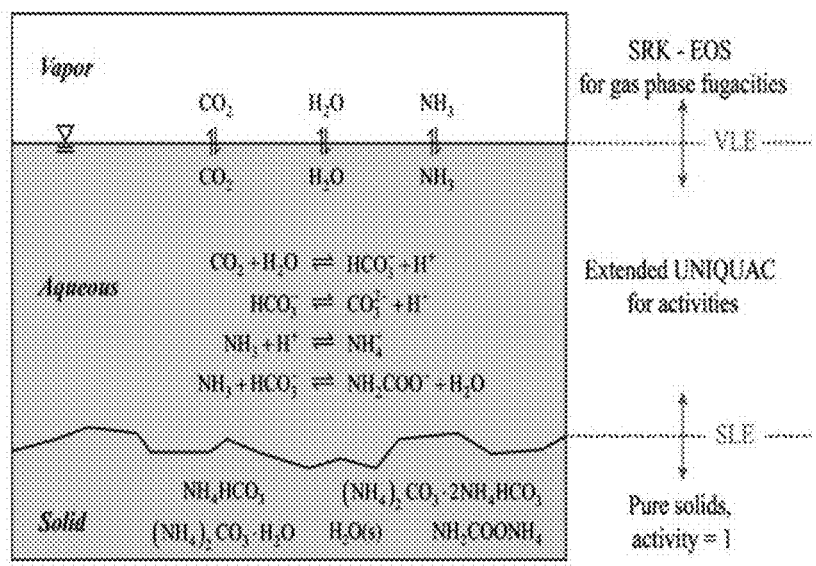

The liquid state maintaining condition is a condition in which dissolved ammonium is maintained in the liquid state. This condition is satisfied by adjusting a ratio among a weight ratio of carbon dioxide, a weight ratio of water, and a weight ratio of ammonia gas within a predetermined range. Referring to FIGS. 14A and 14B, an area indicated by 'L' in the rectangle refers to an area for maintaining in the liquid state, an area indicated by 'L+V' refers to an area for maintaining in the liquid and gaseous states, an area indicated by 'S+L' refers to an area for maintaining in the solid and liquid states, and an area indicated by 'S+L+V' refers to an area for maintaining in the solid, liquid, and gaseous states. According to an embodiment of the present disclosure, the weight ratio of carbon dioxide, the weight ratio of water, and the weight ratio of ammonia gas are adjusted to make dissolved ammonium exist in the area indicated by 'L'. For example, the liquid state maintaining condition for making dissolved ammonium exist at a point indicated by 'P' in FIGS. 14A and 14B is that the weight ratio of carbon dioxide is 0.1, the weight ratio of water is 0.7, and the weight ratio of ammonia gas is 0.2. If an amount of ammonia gas and an amount of water are determined, the pH condition and the liquid state maintaining condition may be satisfied by adjusting the amount of carbon dioxide.

Figure 15:
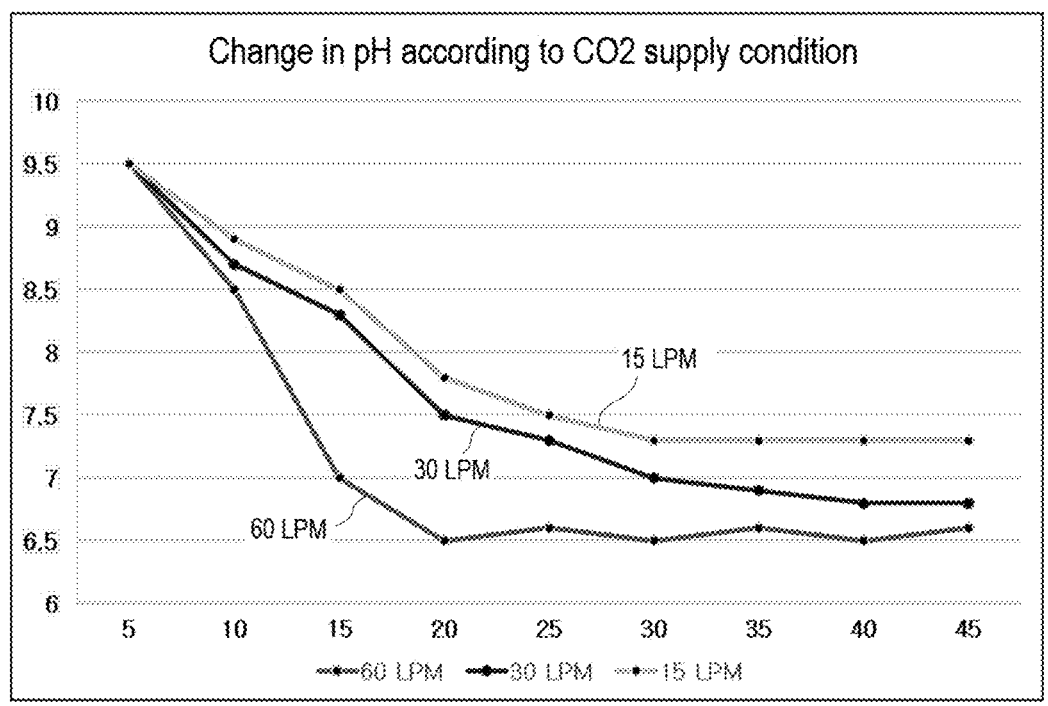

FIG. 15 is a view illustrating reduction of pH in process water according to supply of CO2 ultrafine bubbles using an amount of injected CO2 in a condition where initial pH in process water is 9.5. As can be seen from FIG. 15, pH decreases as the amount of injected CO2 increases. It is shown that CO2 of about 60-30 liters per minute (LMP) should be injected to maintain pH at 7.0 or below, considering a concentration of ammonia gas.

Various embodiments of the present disclosure described below with reference to FIGS. 1 to 11 are configured to operate in a state where the pH condition and the liquid state maintaining condition are satisfied.

Hereinafter, the present disclosure will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

FIG. 1 is a view provided to explain an ammonia gas removal system (hereinafter, "an ammonia gas system") using CO2 ultrafine bubbles according to a first embodiment of the present disclosure.

Referring to FIG. 1, the ammonia gas removal system 10 may include a gas scrubber 100, a fine bubble generation device 200, a scrubber process water storage tank 300, and a dry crystallization device 400. For the purpose of explaining the present disclosure, a CO2 storage 500 is additionally illustrated and respective reference signs are used for pipes.

The gas scrubber 100 receives ammonia gas or ammonia-containing gas (hereinafter, referred to as "ammonia-containing gas"), and processes the received ammonia-containing gas by spraying process water. In the present embodiment, the process water contains fine bubbles containing CO2 gas, and, when the process water is sprayed onto the ammonia-containing gas, ammonia gas may be dissolved in water. The gas scrubber 100 and the scrubber process water storage tank 300 may be operatively coupled to each other, such that process water (for example, process water containing fine bubbles containing CO2 gas) stored in the scrubber process water storage tank 300 is sprayed in the gas scrubber 100, and sprayed material (including process water in which ammonia gas is dissolved) is stored in the scrubber process water storage tank 300. For example, the gas scrubber 100 and the scrubber process water storage tank 300 may be integrally formed with each other.

In the present embodiment, make-up water may flow to fill up to a predetermined water level, such that a level of water stored in the scrubber process water storage tank 300 can be constantly maintained. The reason why the level of the water stored in the scrubber process water storage tank 300 is constantly maintained is to satisfy the pH condition and the liquid state maintaining condition. That is, in the present embodiment, an amount of CO2 gas may be adjusted according to an amount of ammonia gas in the state where an amount of water is constantly maintained.

The configuration for maintaining the level of water constantly or the configurations of the gas scrubber 100 and the scrubber process water storage tank 300 are well-known technology, and thus a detailed description thereof is omitted. For example, Korean Patent Publication No. 10-2015-0064852 (Jun. 12, 2015, titled "Wet gas scrubber") discloses exemplary technology regarding the gas scrubber 100, and the technology disclosed therein is incorporated as a part of the present disclosure within the scope that does not conflict with the present disclosure.

The fine bubble generation device 200 may receive at least a portion of the process water from the scrubber process water storage tank 300, and generates fine bubbles including ultrafine bubbles including CO2 gas in the received process water, and then may provide the process water back to the scrubber process water storage tank 300. The process water received by the fine bubble generation device 200 may include a product ("sprayed material") generated by the spraying operation of the gas scrubber 100.

The fine bubble generation device 200 may receive CO2 from the CO2 storage 500, and make the received CO2 into fine bubbles in the scrubber process water. In the present disclosure, "fine bubbles" refer to bubbles having diameters ranging from a few nanometers to hundreds of micrometers, and in particular, "ultrafine bubbles" refer to bubbles having diameters of 30 micrometers or less. The fine bubble generation device 200 will be described below in detail with reference to FIG. 2.

The CO2 storage 500 may store CO2 liquefied under high pressure, for example, and the CO2 liquefied under high pressure may be injected into an injection portion 230, which will be described below, and may be gasified.

When an enough reaction occurs (enough ammonium is generated) in the process water stored in the scrubber process water storage tank 300, the dry crystallization device 400 may receive the process water and may obtain ammonium carbonate by drying and crystallizing. In the present embodiment, a pipe L2 may be installed between the dry crystallization device 400 and the storage tank 300 to provide a path to allow the process water to move therethrough, and a pump 403 and a valve 401 may be installed in the pipe L2. When it is determined that enough ammonium ions are generated in the process water stored in the storage tank 300, the valve 401 is opened and the process water is moved to the dry crystallization device 400 by the pump 403.

In the present embodiment, the dry crystallization device 400 is illustrated as receiving the process water stored in the scrubber process water storage tank 300, but this is merely an example, and the dry crystallization device 400 may be configured to receive process water flowing into the fine bubble generation device 200 or process water discharged from the fine bubble generation device 200.

Figure 2:
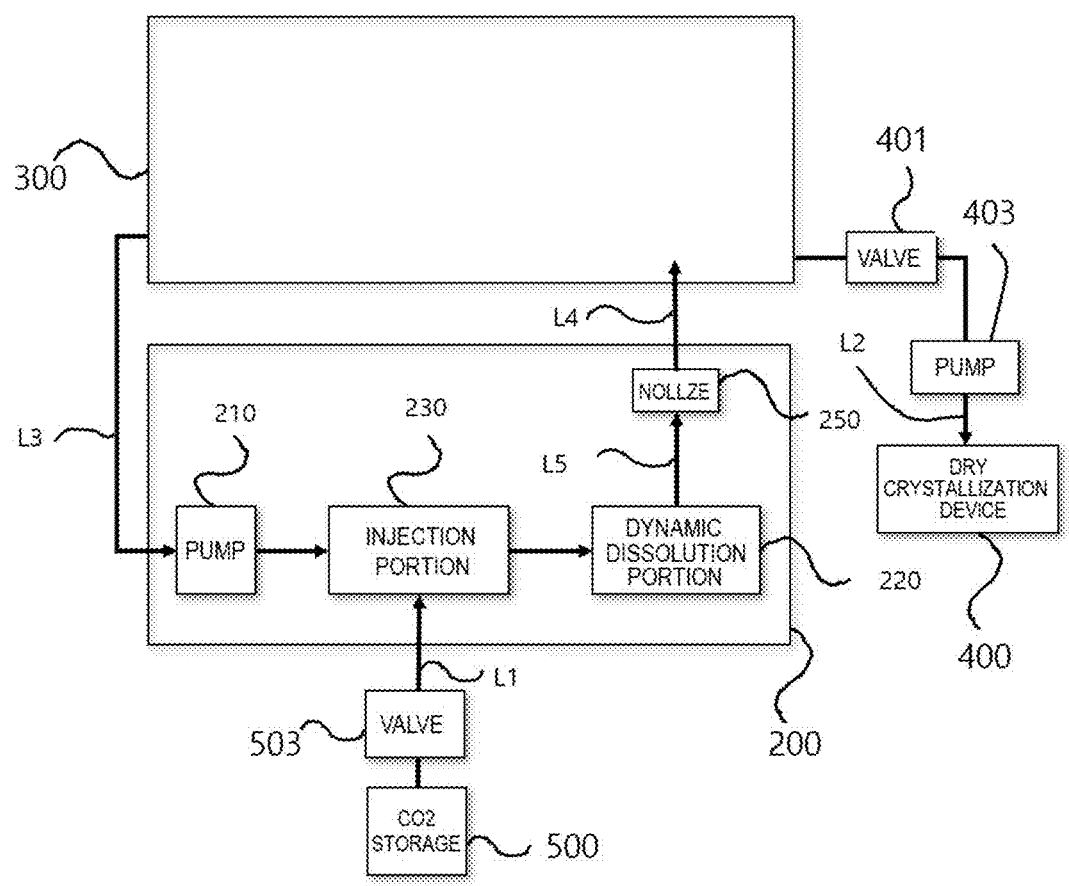
FIG. 2 is a view provided to explain a fine bubble generation device according to an embodiment.

FIG. 2 is a view provided to explain the fine bubble generation device according to an embodiment.

Referring to FIG. 2, the fine bubble generation device according to an embodiment of the present disclosure may include a pump 210, an injection portion 230, a dynamic dissolution portion 220, and a nozzle 250. The pump 200, the injection portion 230, the dynamic dissolution portion 220, and the nozzle 250 may be operatively coupled with one another to make a fluid flow in the order of the pump 210, the injection portion 230, the dynamic dissolution portion 220, and the nozzle 250, and the pump 210 pumps at least a portion of the process water stored in the scrubber process water storage tank 300, and the process water sprayed from the nozzle 250 is provided to the scrubber process water storage tank 300 via a pipe L4.

Injection Portion 230

The injection portion 230 may be configured with a venturi injector. The venturi injector is a pipe that is shaped to have cross sections of both ends larger than a cross section of a center. In the illustrated embodiment, the venturi injector has one end operatively connected with the pump 210, and the other end operatively connected with the dynamic dissolution portion 220. The center of the venturi injector, that is, a portion having a small cross section, is connected with a pipe L1 which receives carbon dioxide.

According to this configuration, when the process water flowing into one end of the venturi injector by the operation of the pump 210 passes through the center of the venturi injector, carbon dioxide is injected and mixed with the process water, and then, the processor water is discharged to the dynamic dissolution portion 220 connected with the other end of the venturi injector.

The configuration of the venturi injector is well-known technology, and thus a detailed description thereof is omitted. For example, technology regarding the venturi injector is disclosed in Korean Utility Model No. 20-02851560000 (Jul. 30, 2002), and technology described in this document is incorporated as a part of the present disclosure within the range that does not conflict with the present disclosure.

Dynamic Dissolution Portion 220

The dynamic dissolution portion 220 receives the process water discharged from the injection portion 230, and whirls at least two times, and then discharges the process water. The process water discharged from the dynamic dissolution portion 230 flows into the nozzle 250 and then is provided to the scrubber process water storage tank 300 via the pipe L4.

The dynamic dissolution portion 220 moves the received process water in a first direction and a second direction, and the first direction and the second direction are opposite to each other.

The dynamic dissolution portion 220 forms turbulence by whirling the process water, and accordingly, carbon dioxide injected into the process water is dissolved and reacts with water ($H_2O$) of the process water, producing carbonic acid ($H_2CO_3$), and the carbonic acid ($H_2CO_3$) is decomposed into two hydrogen ions (H+), a hydrogen carbonate ion ($HCO_3^-$), and a carbonic acid ion ($CO_3^{2-}$). As described above, the dynamic dissolution portion 220 according to an embodiment of the disclosure may cause intense contact between carbon dioxide gas and clean water due to the whirling movement of the process water, thereby enhancing dissolution efficiency and producing hydrogen ions of a high concentration.

Figure 3:
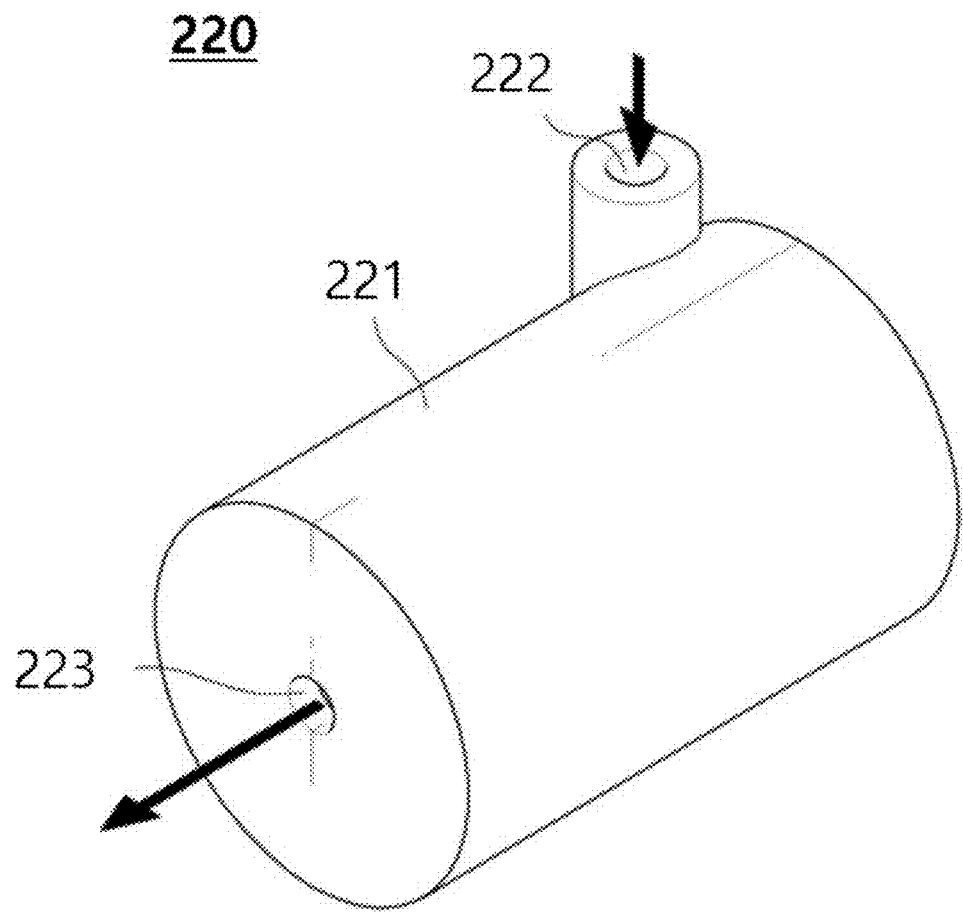
FIGS. 3 to 5 are views provided to explain a dynamic dissolution portion according to an embodiment.
Figure 4:
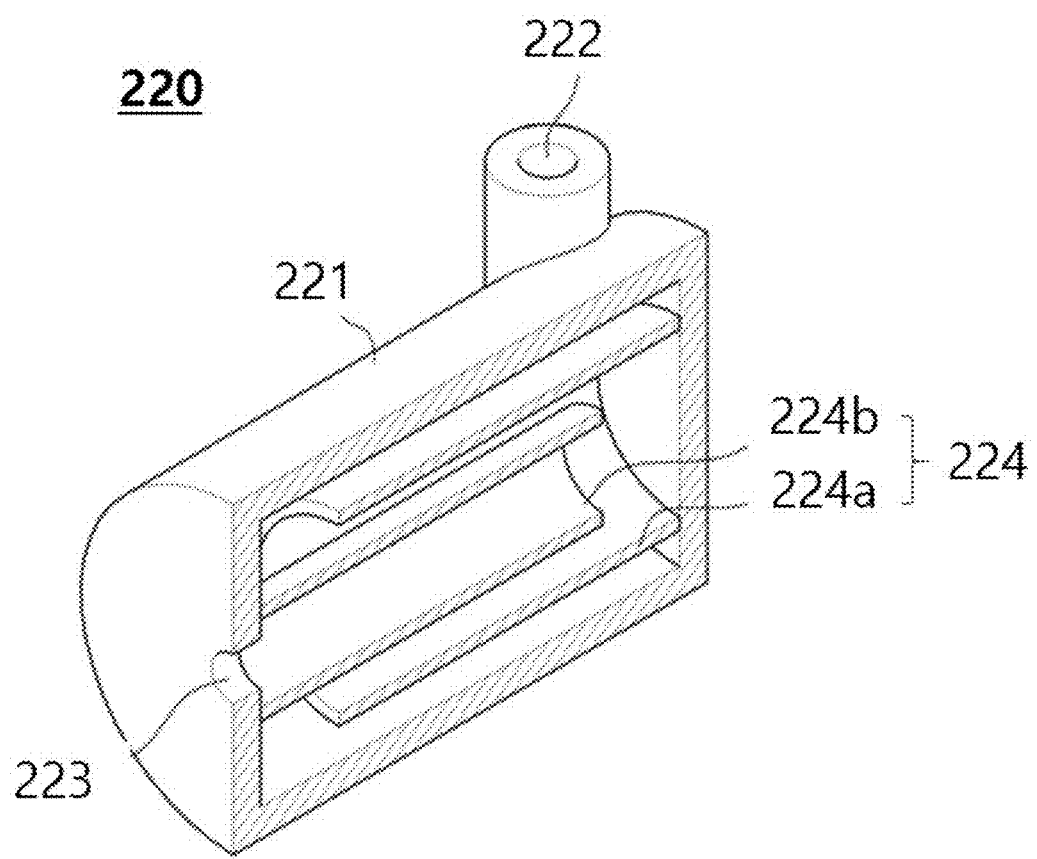
Figure 5:
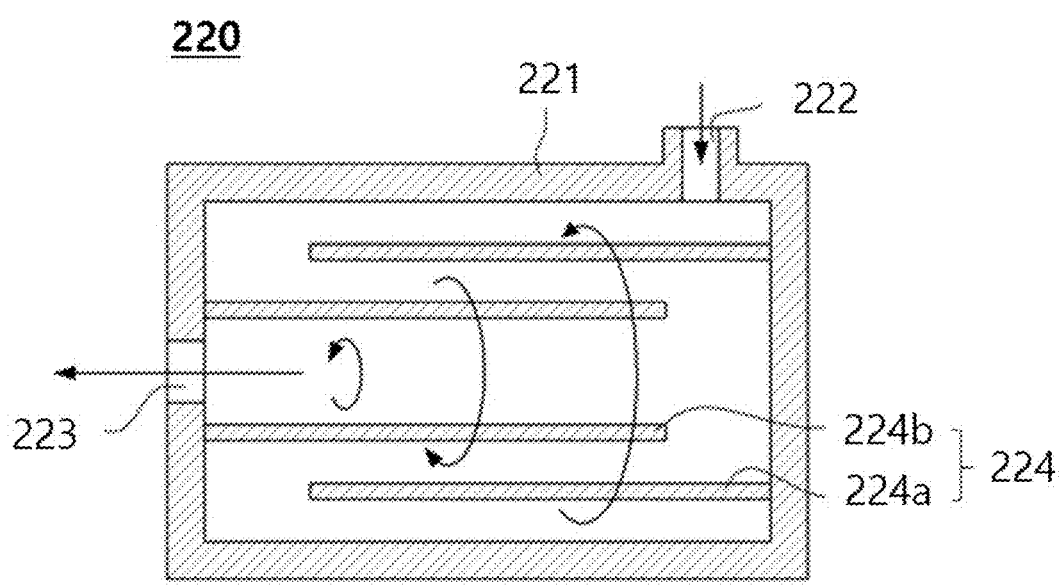
Figure 6:
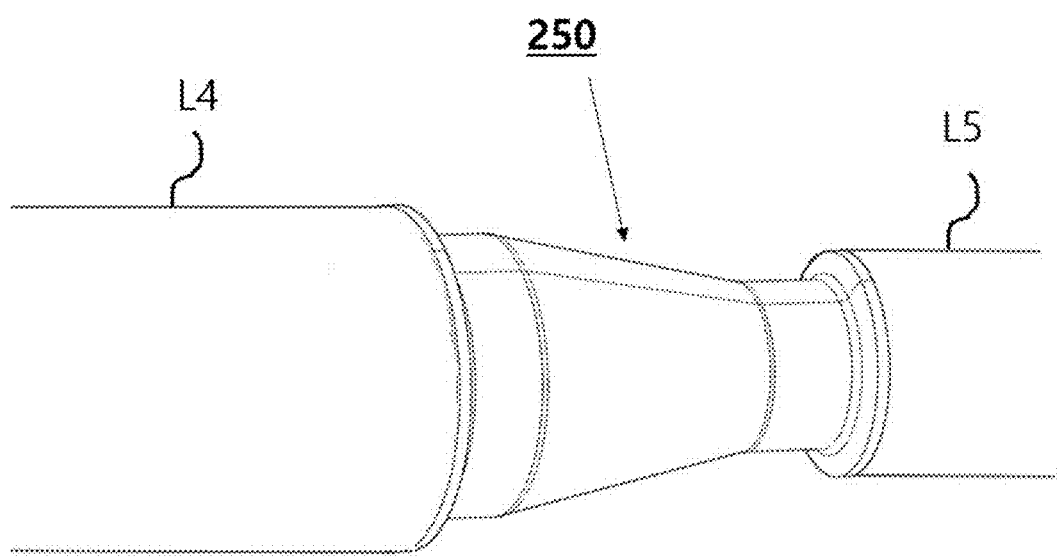
FIG. 6, FIGS. 7A to 7C, FIGS. 8A to 8C, and FIG. 9 are views provided to explain a nozzle according to an embodiment.
Figure 7A:
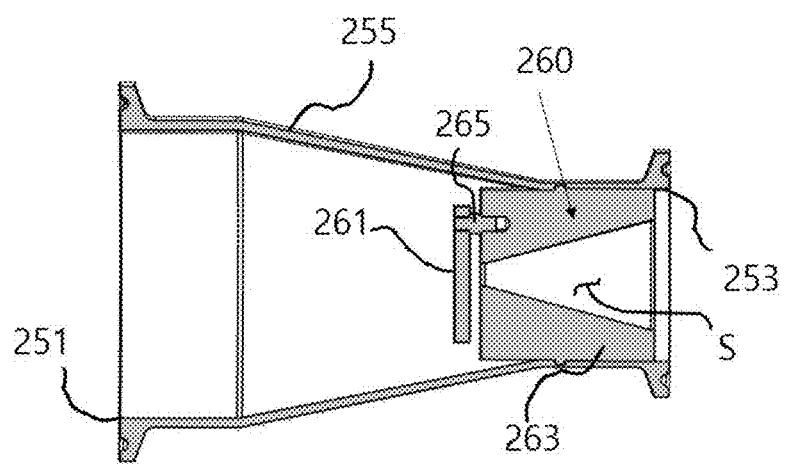
Figure 7B:
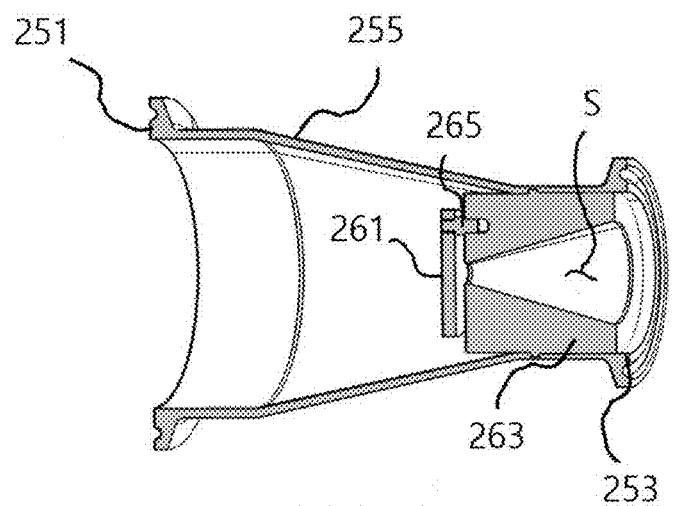
Figure 7C:
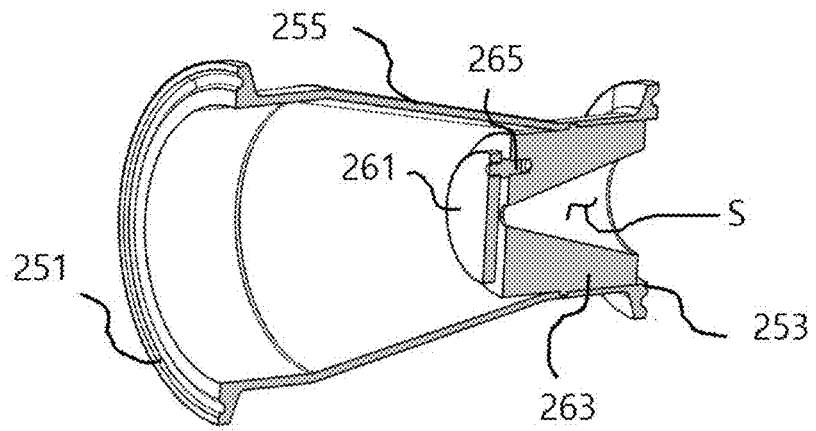
Figure 8A:
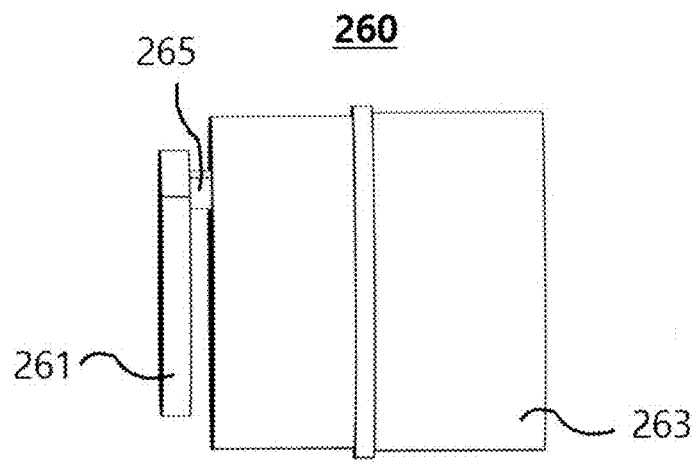
Figure 8B:
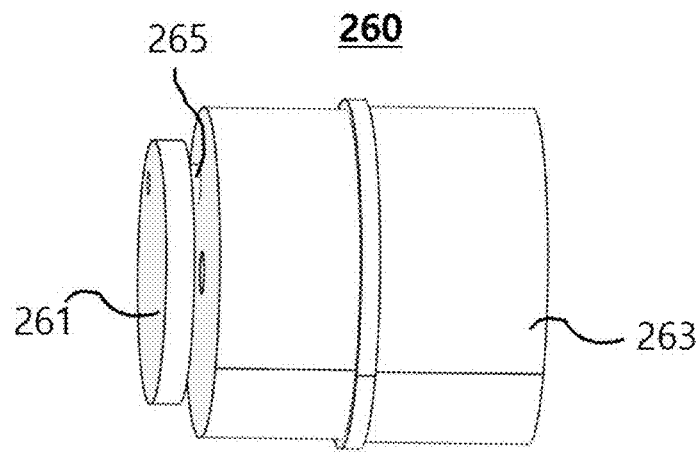
Figure 8C:
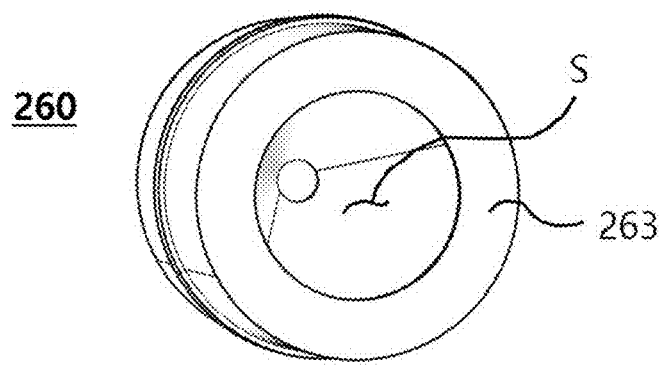
Figure 9:
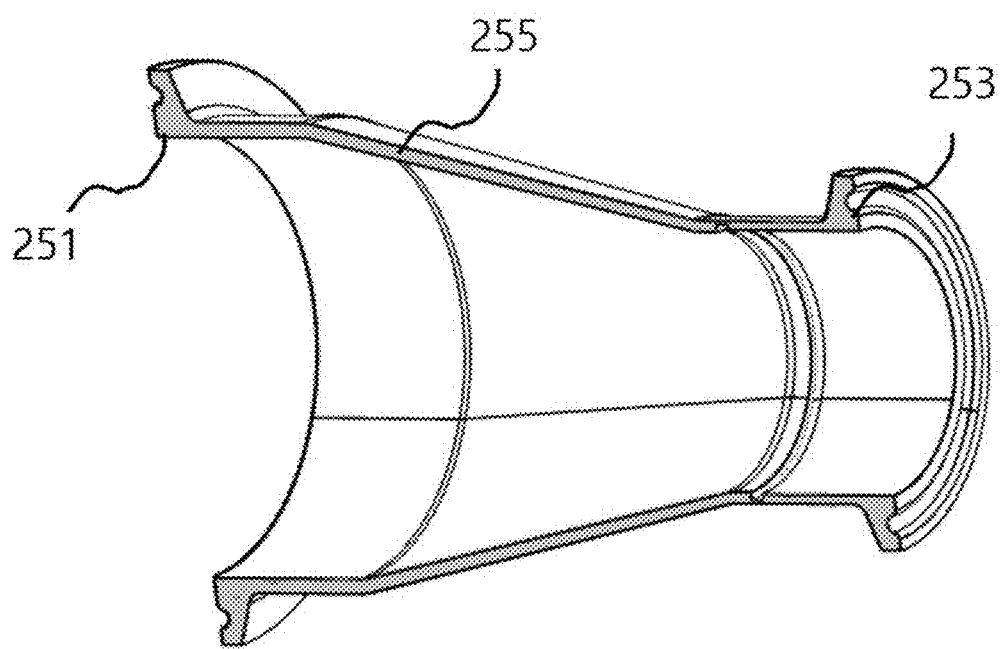

FIGS. 3 to 5 are views provided to explain the dynamic dissolution portion 220 according to an embodiment of the disclosure.

FIG. 3 is a perspective view of the dynamic dissolution portion 220 according to an embodiment, FIG. 4 is a cross sectional view, and FIG. 5 is a cross sectional view. Referring to these drawings, the dynamic dissolution portion 220 according to an embodiment is configured with a substantially cylindrical main body 221. The main body 221 may include an inlet 222 to receive the process water discharged from the injection portion 230, and an outlet 223 to discharge the process water.

In the illustrated embodiment, the main body 221 may have a cylindrical inner space, and the inlet 222 is disposed to allow the process water to flow into the inner space of the main body 221 in a tangential direction. Accordingly, the process water flowing through the inlet 222 helps carbon dioxide easily dissolve in the process water, while whirling in the inner space. In an embodiment, the outlet 223 is formed on a center axis of the cylindrical inner space in a longitudinal direction, and is connected with a pipe L3.

In addition, in the illustrated embodiment, a whirling guide portion 224 is formed in the main body 221 to whirl the process water drawn in through the inlet 222 and to guide the process water toward the outlet 223. The whirling guide portion 224 is configured with at least one cylindrical guide walls 24a, 24b having diameters which are smaller than that of the cylindrical inner space of the main body 221 and are different from each other. In addition, the guide walls 24a, 24b are coaxially aligned with the center axis.

According to this configuration, the process water drawn in through the inlet 222 whirls, and moves while flowing through a space formed between an inner surface of the main body 221 and an outer surface of the first guide wall 224a, a space formed between an inner surface of the first guide wall 224a and an outer surface of the second guide wall 224b, and a space formed between inner surfaces of the second guide wall 224b, and then is discharged to the pipe L3 through the outlet 223. Accordingly, the process water in the main body 221 can move to the outlet 223 while whirling without receiving resistance by inner structures such as the guide walls 24a, 24b, such that pressure exerted to the pump 210 can be minimized and carbon dioxide can be dissolved in the process water in a high concentration.

The main body 221 may be formed with metal or plastic, or various other materials. In addition, the guide walls 24a, 24b may be separately manufactured and may be attached to an inside of the main body 221, or may be integrally formed with the main body 221 in an injection molding method.

The dynamic dissolution portion 220 described above with reference to FIGS. 3 to 5 moves the received process water in the first direction and the second direction, and the first direction and the second direction are opposite to each other. Due to this configuration, carbon dioxide can be dissolved in water at a high concentration in a small space.

Nozzle 250

The nozzle 250 receives the process water discharged from the dynamic dissolution portion 220 and generates fine bubbles containing CO2 gas. The nozzle 250 is inserted into the pipe L4 and a pipe L5 and is integrally formed with the pipes, and the dynamic dissolution portion 220, the nozzle 250, and the scrubber process water storage tank 300 are operatively coupled to one another, such that the nozzle 250 receives the process water discharged from the dynamic dissolution portion 220 and supplies the process water to the scrubber process water storage tank 300.

The nozzle 250 may be positioned inside the process water storage tank 300, or as in the present embodiment, may be positioned in the pipe (L4 or L5) to provide a path to allow the process water to move from the dynamic dissolution portion 220 to the process water storage tank 300.

FIG. 6, FIGS. 7A to 7C, FIGS. 8A to 8C, and FIG. 9 are views provided to explain the nozzle 250 according to an embodiment of the present disclosure. Referring to these drawings, the nozzle 250 includes a main body portion 255 and a pressure collision portion 260. The main body portion 255 is formed in a cylindrical shape to have both ends opened and a hollow formed therein. The pressure collision portion 260 is coupled to one end (hereinafter, "an inflow end 253") of the both ends, and the other end (hereinafter, "an outflow end 251") of the both ends is a place to discharge the process water.

The main body portion 255 has a space formed therein to allow the process water to move therethrough and to have the pressure collision portion 260 positioned therein, and the space is configured to become smaller from the inflow end 253 toward the outflow end 251 in a predetermined section.

The pressure collision portion 260 is coupled with the main body portion 255 by being inserted into the inflow end 253. The pressure collision portion 260 and the main body portion 255 are tightly coupled with each other, and in the present embodiment, a projection is formed on an outer portion of the pressure collision portion 260 and is inserted into a groove formed on an inner portion of the main body portion 255.

The pressure collision portion 260 includes a pressure portion 263 and a collision portion 261, and the pressure portion 263 and the collision portion 261 are spaced apart from each other. The pressure portion 263 is configured to receive the process water and to increase pressure of the received process water. Referring to FIGS. 7A to 7C and FIGS. 8A to 8C particularly, the pressure portion 263 has a space formed therein to allow the process water to move, and the space is configured to have a diameter becoming gradually smaller from the inflow end 253 toward the outflow end 251. The pressure collision portion 260 is structurally arranged to cause the process water sufficiently pressed in the pressure portion 263 to be discharged to the collision portion 261. The pressure portion 263 and the collision portion 261 are structurally arranged to cause the process water discharged from the pressure portion 263 to immediately collide with the collision portion. The collision portion 261 is arranged to be spaced apart from the pressure portion 263 by a predetermined distance, such that the process water discharged through the pressure portion 263 immediately collides with the collision portion 261. For example, the collision portion 261 is formed in a plate shape, and preferably, may be formed in a circular plate shape. The plate-shaped collision portion 261 is operatively connected with the pressure portion 263 to make the center of the plate be aligned with a portion of the pressure portion 263 through which the fluid is discharged. As shown in FIGS. 7A to 7C and FIGS. 8A to 8C, the collision portion 261 and the pressure portion 263 may be connected with each other, being spaced apart from each other by a connection portion 265.

The pressure portion 263 may have a substantially conical shape and includes an inlet and an outlet. The process water flowing into the inlet is discharged from the outlet via the inner space S of the pressure portion 263. A diameter of the outlet may be smaller than a diameter of the inlet, and the inner space S of the pressure portion 263 is gradually reduced from the inlet toward the outlet.

The process water flowing into the inlet of the pressure portion 263 moves toward the outlet, while being pressed, and collides with the collision portion 261 with the pressure being dropped at the moment when the process water is discharged from the outlet.

As in the principle of the present disclosure described in the detailed description, the first embodiment is configured to operate in the state the pH condition and the liquid state maintaining condition are satisfied. Accordingly, the weight ratio of ammonia-containing gas, the weight ratio of water, and the weight ratio of CO2 gas are determined to satisfy the liquid state maintaining condition. A valve 503 may be installed in the pipe L1 between the CO2-containing fine bubble generation device 200 and the CO2 storage 500, and the valve 503 is configured to adjust the amount of CO2 to be provided to the CO2-containing fine bubble generation device 200.

Figure 10:
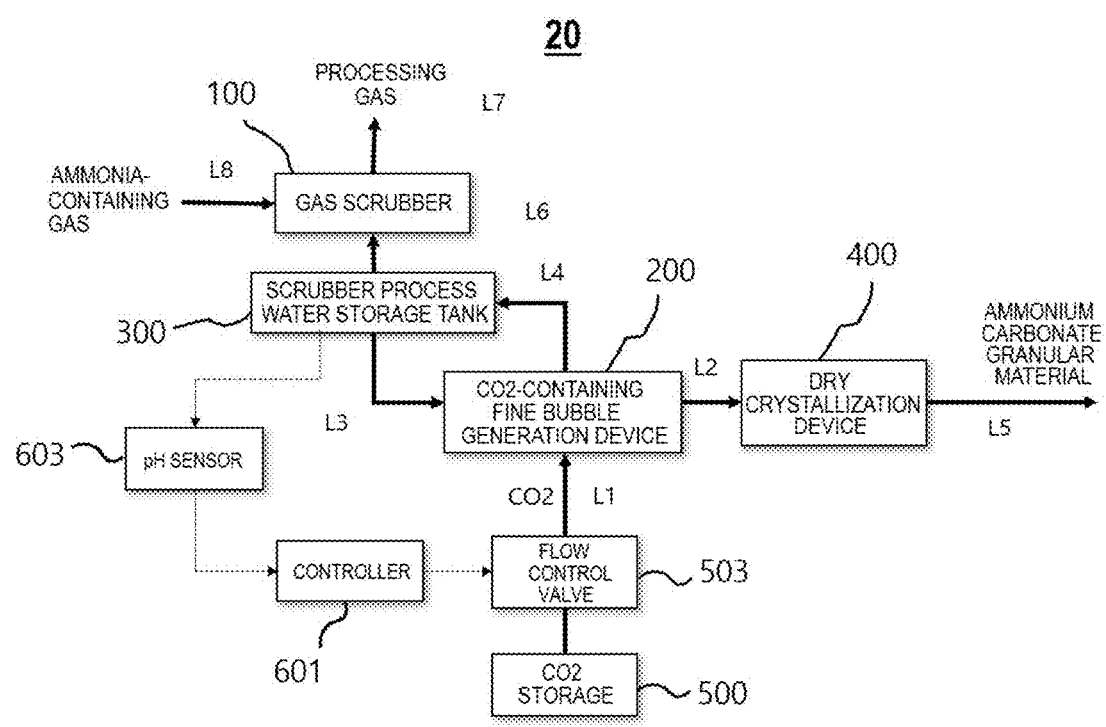
FIG. 10 is a view provided to explain an ammonia gas removal system according to a second embodiment of the present disclosure.

FIG. 10 is a view provided to explain an ammonia gas removal system according to a second embodiment of the present disclosure. Referring to FIG. 10, the ammonia gas removal system 20 according to an embodiment may include a gas scrubber 100, a fine bubble generation device 200, a scrubber process water storage tank 300, a dry crystallization device 400, a pH sensor 603, and a controller 601. For the purpose of explaining the present disclosure, a CO2 storage 500 and a flow control valve 503 are additionally illustrated, and respective reference signs are used for pipes.

Compared to the first embodiment of FIG. 1, the second embodiment of FIG. 10 (hereinafter, a "second embodiment") additionally includes the pH sensor 603 and the controller 601. Accordingly, the components included in the first embodiment and the second embodiment in common (the gas scrubber 100, the storage tank, the CO2-containing fine bubble generation device 200, and the dry crystallization device 400) are the same as each other or are very similar to each other in their functions and structures, and accordingly, a detailed description thereof is omitted, and the difference from the first embodiment will be highlighted.

Referring to FIG. 10, the pH sensor 603 may measure hydrogen ion concentration (pH) (hereinafter, "pH") of scrubber process water stored in the scrubber process water storage tank 300. The pH sensor 603 may be configured to measure pH of the scrubber process water existing in the storage tank, the CO2-containing fine bubble generation device 200, or the gas scrubber 100, or to measure pH while the process water is moving between these components. Although FIG. 10 depicts that the pH sensor 603 detects pH of the process water stored in the scrubber process water storage tank 300, this is merely an example and the pH senor 603 may be configured to detect pH of the process water which is moving through the pipe L3 between the scrubber process water storage tank 300 and the CO2-containing fine bubble generation device 200, the process water existing in the CO2-containing fine bubble generation device 200, and/or the process water which is moving through the pipe L4 between the CO2-containing fine bubble generation device 200 and the scrubber process water storage tank 300.

The result of detecting by the pH sensor 603 is provided to the controller 601. The controller 601 controls operations of the flow control valve 503 on the basis of the result of detecting by the pH sensor 603. The controller 601 controls the amount of CO2 provided to the CO2-containing fine bubble generation device 200, on the basis of the result of detecting by the pH sensor 603. The flow control valve 503 adjusts the amount of CO2 provided to the CO2-containing fine bubble generation device 200 under control of the controller 601.

As described above, ammonia gas exists in the form of ammonium ions at low pH, and such ammonium ions may exist in the liquid state in an appropriate condition (at an appropriate ratio among the weight ratio of carbon dioxide, the weight ratio of water, and the weight ratio of ammonia gas).

The controller 601 may satisfy the two conditions, the pH condition (pH for converting ammonia gas into ammonium by 80% or higher, preferably by 90% or higher, more preferably by 100% or higher), and the liquid state maintaining condition (a ratio among the weight ratio of carbon dioxide, the weight ratio of water, and the weight ratio of ammonia gas), by adjusting the amount of CO2. That is, the controller 601 determines an amount of CO2 to make ammonia gas be dissolved into 100% ammonium ions, and to make ammonium ions exist in the liquid state, and controls the flow control valve 503 on the basis of the determined amount of CO2.

As in the principle of the present disclosure described in the detailed description, the second embodiment is configured to operate in the state where the pH condition and the liquid state maintaining condition are satisfied. Accordingly, the weight ratio of ammonia-containing gas, the weight ratio of water, and the weight ratio of CO2 gas in the gas scrubber 100 are determined to satisfy the liquid state maintaining condition.

From among the components included in the first embodiment and the second embodiment, the fine bubble generation device 200 and the controller 601 are all referred to as a fine bubble generation system. The fine bubble generation device 200 may generate fine bubbles including carbon dioxide gas in the process water to be sprayed onto ammonia-containing gas, and the controller 601 may adjust the amount of carbon dioxide gas to be injected into the fine bubble generation device 200 by controlling the flow control valve installed in the pipe providing carbon dioxide gas to the fine bubble generation device 200.

The fine bubble generation system may include the pH sensor 603, and the controller 601 may adjust the amount of carbon dioxide gas to be injected into the fine bubble generation device 200 on the basis of the result of detecting by the pH sensor 603.

The controller 601 may adjust the amount of carbon dioxide gas to be injected into the fine bubble generation device 200 to match the ratio among the weight ratio of carbon dioxide included in the process water, the weight ratio of water, and the weight ratio of ammonia gas with a reference ratio. Herein, the reference ratio is a pre-defined ratio for making ammonium ions existing the process water exist in the liquid state. For example, the reference ratio may be defined to make the ratio among the weight ratio of carbon dioxide, the weight ratio of water, and the weight ratio of ammonia gas exist in the area indicated by "L" in FIG. 13A.

Figure 11:
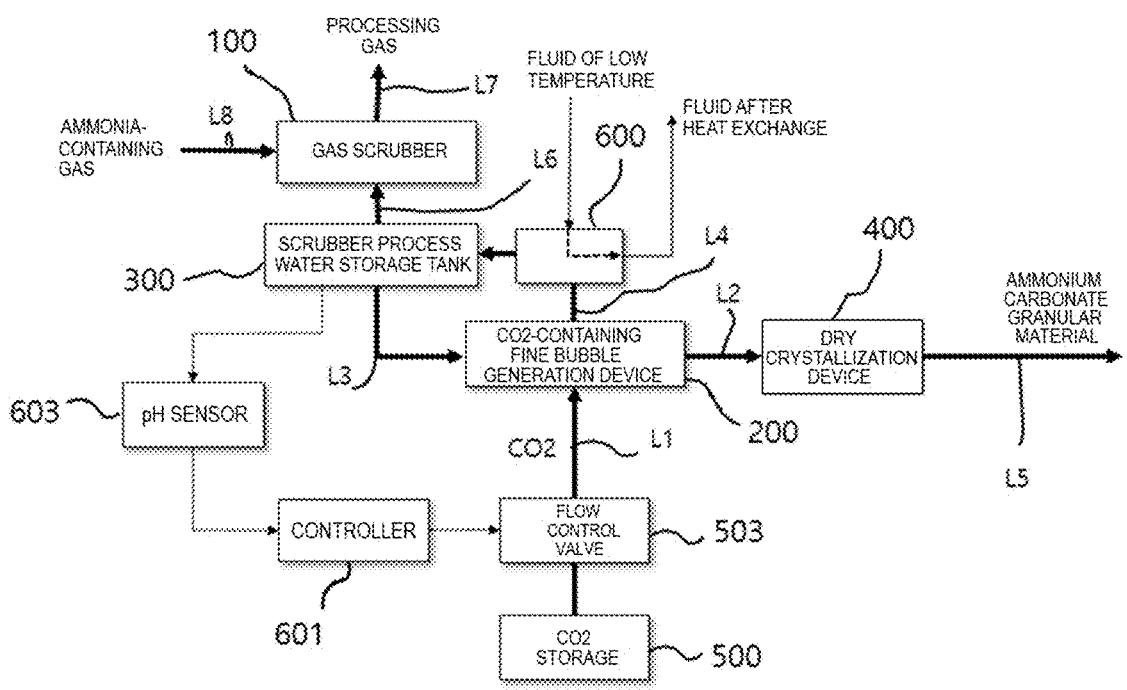
FIG. 11 is a view provided to explain an ammonia gas removal system according to a third embodiment of the present disclosure.

FIG. 11 is a view provided to explain an ammonia gas removal system according to a third embodiment of the present disclosure. Referring to FIG. 11, the ammonia gas removal system 30 according to an embodiment may include a gas scrubber 100, a fine bubble generation device 200, a scrubber process water storage tank 300, a dry crystallization device 400, a heat exchanger 600, a pH sensor 603, and a controller 601.

Comparing the embodiment of FIG. 11 and the embodiment of FIG. 10, there is a difference between the second embodiment and the third embodiment in that the embodiment of FIG. 11 further includes the heat exchanger 600. Hereinafter, the difference from the second embodiment will be highlighted.

The heat exchanger 600 is prepared for the purpose of reducing temperature of a fluid provided from the CO2-containing fine bubble generation device 200 to the scrubber process water storage tank 300. Preferably, the heat exchanger 600 is installed in the pipe L3 to reduce the temperature of the fluid provided from the fine bubble generation device 200 to the scrubber process water storage tank 300 to 40 degrees (Celsius) or lower. The heat exchanger 600 may be thermally coupled with the pipe L3 to reduce the temperature of the fluid flowing through the pipe L3 to 40 degrees (Celsius) or lower. More preferably, the heat exchanger 600 is thermally coupled with the pipe L3 to reduce the temperature of the fluid flowing through the pipe L3 to 20 degrees (Celsius) or lower. More preferably, the heat exchanger 600 is thermally coupled with the pipe L3 to reduce the temperature of the fluid flowing through the pipe L3 to 0 degree (Celsius) or lower. A fluid (refrigerant) exchanging heat with the fluid flowing through the pipe L3 may be provided from an external device (not shown). As described above, the heat exchanger 600 is installed, such that fine bubbles can be more efficiently generated.

Although the dry crystallization device 400 is included in various embodiments including the first embodiment, the second embodiment, and the third embodiment, the dry crystallization device 400 may not be included. That is, in the above-described embodiments, materials discharged from the CO2-containing fine bubble generation device 200 through the pipe L2 may be discharged to a waste water processor (not shown), not to the dry crystallization device 400.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description of the present disclosure but by the appended claims, and all differences within the scope will be construed as being included in the present disclosure.

What is claimed is:

1. An ammonia gas removal system comprising:
    a fine bubble generation device configured to receive at least a portion of scrubber process water from a storage tank and to generate fine bubbles containing carbon dioxide gas in the received scrubber process water;
    a gas scrubber configured to spray the scrubber process water stored in the storage tank onto ammonia-containing gas; and
    the storage tank configured to store the scrubber process water to be provided to the gas scrubber,
    wherein the gas scrubber and the storage tank are operatively coupled to each other, such that a product generated by a spraying operation of the gas scrubber is stored in the storage tank,
    wherein a portion of the scrubber process water, stored in the storage tank and containing the product, is provided to the fine bubble generation device, and the fine bubble generation device is configured to generate the fine bubbles containing carbon dioxide gas in the scrubber process water provided from the gas scrubber, and to provide the scrubber process water containing the fine bubbles to the storage tank.

2. The ammonia gas removal system of claim 1, wherein the fine bubble generation device comprises an injection portion configured to inject carbon dioxide gas into the scrubber process water provided from the storage tank, and a dynamic dissolution portion configured to whirl a fluid discharged from the injection portion 230 at least two times and then to discharge the fluid, and
    wherein an advancing direction of the fluid in the dynamic dissolution portion comprises a first direction and a second direction, and the first direction and the second direction are opposite to each other.

3. The ammonia gas removal system of claim 1, wherein the fine bubble generation device further comprises a nozzle configured to receive a solution discharged from a dynamic dissolution portion and to spray the solution, and
    wherein the nozzle is positioned inside the storage tank or is positioned in a pipe providing a path to allow the scrubber process water to move from the dynamic dissolution portion to the storage tank therethrough.

4. The ammonia gas removal system of claim 1, further comprising:
    a pH sensor configured to detect pH of the scrubber process water stored in the storage tank, or pH of the scrubber process water circulating between the storage tank and the fine bubble generation device; and
    a controller configured to adjust an amount of CO2 to be injected into the fine bubble generation device 200 on the basis of a result of detecting by the pH sensor.

5. The ammonia gas removal system of claim 4, wherein the fine bubble generation device comprises an injection portion configured to inject carbon dioxide gas into the scrubber process water provided from the storage tank, and a dynamic dissolution portion configured to whirl a fluid discharged from the injection portion at least two times, and then to discharge the fluid, and
    wherein an advancing direction of the fluid in the dynamic dissolution portion comprises a first direction and a second direction, and the first direction and the second direction are opposite to each other.

6. The ammonia gas removal system of claim 4, wherein the fine bubble generation device further comprises a nozzle configured to receive a solution discharged from a dynamic dissolution portion and to spray the solution, and
    wherein the nozzle is positioned inside the storage tank or is positioned in a pipe providing a path to allow the scrubber process water to move from the dynamic dissolution portion to the storage tank therethrough.

* * * * *